May 25, 1926.
S. G. DOWN
1,585,833
VARIABLE LOAD DEVICE
Filed July 23, 1924
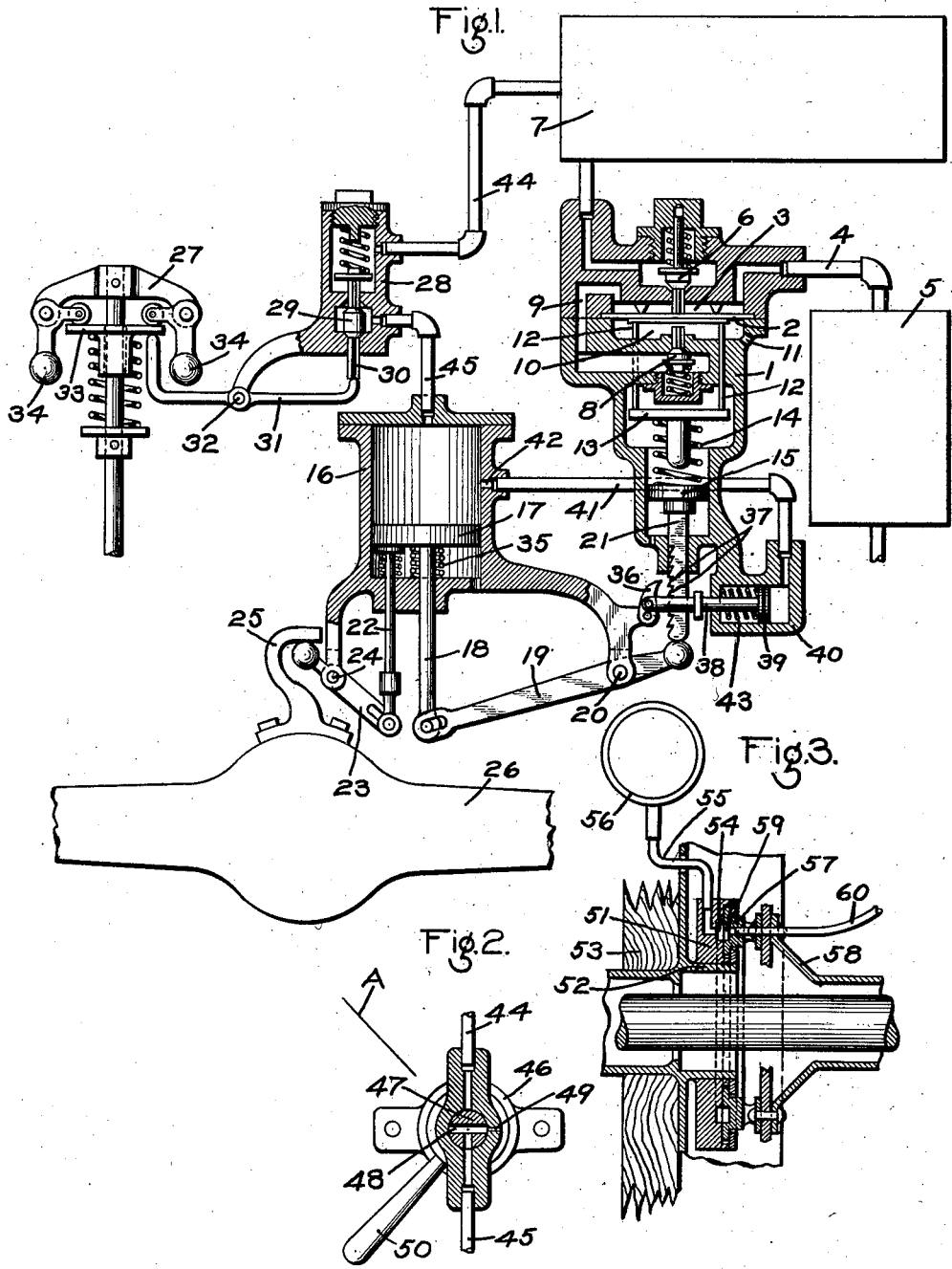
INVENTOR
SIDNEY G. DOWN
BY Wm. M. Cady
ATTORNEY Patented May 25, 1926.

1,585,833

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD DEVICE.

Application filed July 23, 1924. Serial No. 727,720.

This invention relates to fluid pressure regulating devices, and has for its principal object to provide means for regulating fluid pressure according to variations in the load on a vehicle.

By providing a source of fluid pressure on the vehicle, the pressure of which varies with the load on the vehicle, various purposes may be served, such as the control of the brakes according to the load on the vehicle, the maintenance of the pressure in the tires to correspond with the load, and the regulation of the pressure for air springs as the load changes.

Other objects and advantages will appear in the following more detailed description of the invention.

In the accompanying drawing; Fig. 1 is a diagrammatic, sectional view of a mechanism for regulating the pressure of fluid according to the load on the vehicle and embodying my invention; Fig. 2 a sectional view of a manually operated means for cutting the pressure regulating mechanism into and out of action; and Fig. 3 a sectional view of means for supplying fluid under a pressure varying with the load to the pneumatic tire of the vehicle.

According to my invention, the mechanism may comprise a pressure regulating valve device comprising a casing 1 containing a flexible diaphragm 2, having chamber 3 at one side connected by pipe 4 to a storage reservoir 5, from which fluid at a pressure corresponding with the load on the vehicle is supplied.

The movement of diaphragm 2 in one direction is adapted to unseat a fluid supply valve 6 and permit the supply of fluid under pressure from a source of fluid pressure, such as reservoir 7, to chamber 3 and the reservoir 5. The movement of the diaphragm 2 in the opposite direction is adapted to unseat an exhaust valve 8 for venting fluid from chamber 3, through passage 9, to diaphragm chamber 10, which is open to the atmosphere through port 11.

Rods 12 extend from diaphragm 2 and engage a spring plate 13, subject to the pressure of a coil spring 14, the pressure of which is varied by the movement of a piston 15.

For positioning the piston 15 and thereby determining the compression of spring 14, a mechanism controlled by the relative movement of the vehicle body, with respect to the axle, and according to the load on the vehicle is provided, comprising a cylinder 16 secured to the vehicle body and containing a piston 17 having a stem 18. A lever 19, fulcrumed on the pivot pin 20, is pivotally connected at one end to the piston stem 18 and the other end engages the lower end of a plunger 21 carried by the piston 15.

The adjusting movement of piston 17 is determined by the position of a rod 22 pivotally connected to one end of a lever 23. The lever 23 is fulcrumed on a pivot pin 24 and the other end of the lever is adapted to engage a hook member 25, which is secured to an unsprung portion of the vehicle, such as the axle housing 26.

In order to prevent the adjusting mechanism from acting continuously while the vehicle is running along the road, means are provided for cutting same out of action, such as that shown in Fig. 1, comprising a fly ball speed governor 27 operatively connected to an element on the vehicle which rotates when the vehicle is running, such as a vehicle axle, and a valve device 28 for controlling the admission and release of fluid to and from the piston 17. The valve device 28 may comprise a casing containing a double beat valve 29 having a stem 30 adapted to engage one end of a lever 31, fulcrumed on a pivot pin 32, and having the other end bent to engage the movable plate 33 of the governor 27.

In operation, when the vehicle is running along the road, the balls 34 of the governor fly out and actuate the plate 33, so as to depress the engaging end of lever 31. The other end of said lever then moves the double beat valve 29 to its upper seat, so that piston 17 is connected to the atmosphere. Spring 35 then acts to shift the piston 17 upwardly, and thus causes the lever 19 to be shifted, so that the outer end of same is free from engagement with the plunger 21 and thus any movement of the plunger 21 while the vehicle is running will be prevented.

When the vehicle is brought to a stop, the governor balls 34 drop down to the position shown in Fig. 1, permitting the lever 31 to move so that the double beat valve 29 will seat on its lower seat, in which the atmospheric connection to piston 17 is closed and communication is opened for admitting fluid under pressure from reservoir 7 to said piston.

The piston 17 will then be moved downwardly by fluid under pressure until it is stopped by engagement with the upper end of the rod 22. The position of the rod 22 is determined by the load on the vehicle and if the load is increased, for example, the vehicle body and the cylinder 16 will be moved downwardly relative to the axle housing 26. This permits a corresponding upper movement of the end of lever 23 which engages the hook member 25 and thus permits a downward movement of the rod 22. The piston 17 will therefore move to the position as determined by the rod 22 and will act through the lever 19 to shift the plunger 21 and piston 15 to compress the spring 14 to a degree corresponding with the load on the vehicle.

The pressure of spring 14 is transmitted through the rods 12 to one side of the diaphragm 2 and if the pressure in reservoir 5, acting on the opposite side of the diaphragm is less than the adjusted pressure of spring 14, the diaphragm will be moved upwardly, so as to open the valve 6 and thus admit fluid under pressure from the reservoir 7 to the reservoir 5. When the pressure in resevoir 5 has been increased to a degree slightly exceeding the pressure of spring 14, the diaphragm 2 will be operated to permit valve 6 to seat and cut off the further supply of fluid to reservoir 5.

If the load on the vehicle is decreased, the rod 22 will be moved upwardly, so as to reduce the amount of movement of the piston 17 and this permits the plunger 21 to move downwardly and thus reduce the compression of spring 14. If the pressure in reservoir 5 is greater than the pressure of spring 14, the diaphragm 2 will be moved downwardly so as to open the valve 8 and thus vent fluid from reservoir 5 through passage 9, past the valve 8 to chamber 10 and thence to exhaust port 11.

It will thus be seen that the pressure in reservoir 5 is reduced or increased by operation of the mechanism described to provide a pressure in the reservoir corresponding with the load on the vehicle.

In order to lock the plunger 21 in its position of adjustment so that the adjusted compression of spring 14 will be maintained while the vehicle is running, a pawl 36 is provided. Said pawl is adapted to engage notches or teeth 37 in the plunger 21 and is pivotally connected to a piston rod 38, carried by a piston 39 contained in cylinder 40.

The cylinder 40 is connected to a pipe 41 which leads to a port 42 in the wall of cylinder 16. With this arrangement, when the vehicle is brought to a stop and fluid under pressure is supplied to cylinder 16, as hereinbefore described, as soon as piston 17 is moved downwardly, past the port 42, fluid is admitted, through pipe 41 to cylinder 40 and piston 39 is then operated so as to throw the pawl 36 out of engagement with the teeth of the plunger 21.

It will thus be seen that when the vehicle is not running, the plunger 21 may be freely adjusted by the operation of the adjusting mechanism, as hereinbefore described. When the vehicle is started, the piston 17 is shifted to its upper position, due to the venting of fluid under pressure from piston 17 by the operation of the speed governor 27, but at the same time, fluid is also vented from piston 39 by way of pipe 41 and port 42, in fact, the piston 39 will move before the piston 17 moves upwardly, since piston 39 has less resistance to movement, and since spring 43 acts on piston 39 with greater force relative to the opposing fluid pressure. The pawl 36 is thus operated by the outward movement of piston 39, so as to engage a tooth of the plunger 21 and thus lock and prevent movement of said plunger.

Instead of employing the speed governor 27, as shown in Fig. 1, the regulating mechanism may be cut into and out of action by the operation of a manually operated lever or handle, preferably a handle or lever on the vehicle which is moved when the vehicle is brought to a stop, such as the ignition switch lever.

In Fig. 2 is shown a valve device 46 having a valve 47 adapted in one position to connect pipe 44, leading to reservoir 7, through passage 48, with pipe 45, leading to cylinder 16, and in another position to connect pipe 45 with an exhaust port 49. The position of handle 50 for operating the valve 47, as shown in the drawing, is that in which the handle remains when the vehicle is brought to a stop. When the vehicle is running, the handle 50 is moved to position indicated by the letter A in Fig. 2, in which cylinder 16 is connected to the atmosphere.

The fluid pressure in reservoir 5, which is thus regulated to correspond with the load on the vehicle may be employed to control fluid pressure brakes on the vehicle, in which case the braking pressure will be proportional to the load on the car. The fluid pressure in reservoir 5 may also be connected to the air pressure chamber of air springs, so that the air pressure of the air springs will vary to correspond with the load.

Another purpose is to maintain the pressure in the vehicle tires to correspond with the load on the vehicle and for this purpose, each wheel of the vehicle may be provided with means for connecting the reservoir 5 with the tire. As shown in Fig. 3, said means may comprise a ring 51, secured to the hub 52 of the vehicle wheel 53 and having an annular recess 54 at one side which is connected by a flexible pipe 55 to the inner tube of the tire 56.

A non-rotating ring 57 is secured to the axle housing 58 and is disposed in the ring 51, so as to permit of relative sliding movement between the rings, the ring 57 being provided with an annular groove 59 which registers with the groove 54. The groove 59 is connected through flexible pipe 60 with the reservoir 5, so that the fluid pressure in the tire 56 will always be proportional to the load on the vehicle.

Having now described my invention, what I claim as new and desire to secure by Letters Patent, is:—

1. In combination, a fluid pressure regulating valve device on a vehicle for controlling the pressure of fluid maintained in a receptacle, means for adjusting said valve device to vary the pressure of fluid maintained in said receptacle, and means controlled according to the load on the vehicle for operating said adjusting means, to thereby maintain a pressure in said receptacle proportional to the load on the car.

2. The combination with a fluid pressure regulating valve device on a vehicle for regulating the pressure of fluid maintained in a receptacle, of means operated by variations in the load on the vehicle for controlling the operation of said valve device, to thereby maintain a pressure in said receptacle proportional to the load on the car.

3. The combination with a fluid pressure reservoir on a vehicle, of means operated by variations in the load on the vehicle for regulating the fluid pressure in said reservoir in proportion to variations in the load on the vehicle.

4. The combination with a fluid pressure reservoir and a fluid pressure regulating valve device on a vehicle having valve means for controlling the admission and exhaust of fluid under pressure to and from said reservoir, of means operated by variations in the load on the vehicle for controlling the operation of said valve means.

5. In combination, a receptacle, a valve device comprising valves for supplying and exhausting fluid under pressure to and from said receptacle, a spring, and a movable abutment subject to the opposing pressures of said receptacle and said spring, and means operated by variations in the load on a vehicle for varying the compression of said spring.

6. The combination with a receptacle on a vehicle, of a fluid pressure regulating device for controlling the pressure of fluid in said receptacle, means for adjusting said device to operate at different pressures, a piston for operating said means, and means operated according to variations in the load on the vehicle for limiting the movement of said piston.

7. The combination with a receptacle on a vehicle, of a fluid pressure regulating device for controlling the pressure of fluid in said receptacle, means for adjusting said device to operate at different pressures, a piston for operating said means, and a movable stop operated according to the load on the car for defining the position of said piston.

8. In combination, a fluid under pressure receptacle on a vehicle, means for regulating the pressure of fluid maintained in said receptacle, mechanism for cutting said regulating means into and out of action, and a governor operatively connected to rotate when the vehicle is running for controlling the operation of said mechanism.

9. In combination, a fluid under pressure receptacle on a vehicle, means for regulating the pressure of fluid maintained in said receptacle at a pressure corresponding with the load on the vehicle, and means for cutting said regulating means out of action when the vehicle is running.

10. In combination, a fluid under pressure receptacle on a vehicle, means for regulating the pressure of fluid maintained in said receptacle at a pressure corresponding with the load on the vehicle, and a governor device driven by the running of the vehicle for controlling the operation of said regulating means.

11. In combination, a fluid pressure regulating valve device on a vehicle, means for adjusting said valve device to operate at different pressures including a piston, valve means for controlling the fluid pressure for operating said piston, and means operated according as the vehicle is running or stopped for controlling the fluid pressure on said piston.

12. In combination, a fluid pressure regulating valve device on a vehicle, means for adjusting said valve device to operate at different pressures including a piston, valve means for controlling the fluid pressure for operating said piston, valve means for controlling the fluid pressure on said piston, and a governor device controlled by the running of the vehicle for controlling the operation of said valve means.

13. The combination with a fluid pressure regulating valve device and means for adjusting said valve device to operate at different pressures, of a piston for operating said adjusting means, and valve means for controlling the fluid pressure on said piston.

14. The combination with a fluid pressure regulating valve device and means for adjusting said valve device to operate at different pressures, of a piston for operating said adjusting means, valve means for controlling the fluid pressure on said piston, and means for operating said valve means when the vehicle is running to vary the fluid pressure on said piston and thereby move same to a non-adjusting position.

15. The combination with a fluid pressure regulating valve device and means for adjusting said valve device to operate at different pressures, a piston operated by fluid under pressure for operating said adjusting means, valve means for controlling the fluid pressure on said piston, and means for operating said valve means when the receptacle is brought to a stop to supply fluid under pressure to said piston.

16. The combination with a fluid pressure regulating valve device and means for adjusting said valve device to operate at different pressures, a piston operated by fluid under pressure for operating said adjusting means, valve means for controlling the fluid pressure on said piston, and a governor device driven when the vehicle is running for operating said valve means when the vehicle is brought to a stop to supply fluid under pressure to said piston.

17. In combination, a fluid pressure regulating valve device on a vehicle including a regulating spring, a movable member for adjusting the compression of said spring, a lever for operating said member, a piston for operating said lever, an adjustable stop for said piston, and means controlled by the load on the vehicle for operating said adjustable stop.

18. In combination, a fluid pressure regulating valve device on a vehicle including a regulating spring, a movable member for adjusting the compression of said spring, means for locking said member in its adjusted position, and fluid pressure controlled means for operating said locking means.

19. In combination, a fluid pressure regulating valve device on a vehicle including a regulating spring, a movable member for adjusting the compression of said spring, a piston operated by fluid under pressure for operating said member, and fluid pressure controlled means for locking said member in its adjusted position.

20. In combination, a fluid pressure regulating valve device on a vehicle including a regulating spring, a movable member for adjusting the compression of said spring, a piston operated by fluid under pressure for operating said member, a pawl for locking said member in its adjusted position, and means operated by fluid under pressure for releasing said pawl.

21. In combination, a fluid pressure regulating valve device on a vehicle including a regulating spring, a movable member for adjusting the compression of said spring, a piston operated by fluid under pressure for operating said member, a pawl for locking said member in its adjusted position, and means operated by fluid pressure supplied upon movement of said piston for releasing said pawl.

22. The combination on a vehicle with a fluid pressure regulating means for maintaining the pressure in a receptacle to correspond with the load on the vehicle, of means for supplying fluid under pressure from said receptacle to a tire of the vehicle.

23. The combination on a vehicle with a fluid pressure regulating means for maintaining the pressure in a receptacle to correspond with the load on the vehicle, of means for maintaining a constant communication from said receptacle to the tires of the vehicle.

24. The combination on a vehicle with a fluid pressure regulating means for maintaining the pressure in a receptacle to correspond with the load on the vehicle, of means for maintaining a constant communication from said receptacle to the tires of the vehicle to thereby maintain the pressure in the tires to correspond with the load on the vehicle.

25. The combination with a receptacle, of a fluid pressure regulating device for controlling the pressure in said receptacle comprising a diaphragm subject to the opposing pressures of said receptacle and a spring, a supply valve operated by said diaphragm for admitting fluid under pressure to said receptacle, an exhaust valve operated by said diaphragm for venting fluid from said receptacle, and means for varying the pressure of said spring on the diaphragm.

In testimony whereof I hereunto set my hand.

SIDNEY G. DOWN.